(12) United States Patent
Karogal

(10) Patent No.: US 9,327,366 B2
(45) Date of Patent: May 3, 2016

(54) FLUX CORED ELECTRODE

(71) Applicant: Lincoln Global, Inc., City of Industry, CA (US)

(72) Inventor: Nikhil Karogal, Cleveland, OH (US)

(73) Assignee: Lincoln Global, Inc., City of Industry, CA (US)

( * ) Notice: Subject to any disclaimer, the term of this patent is extended or adjusted under 35 U.S.C. 154(b) by 408 days.

(21) Appl. No.: 13/953,269

(22) Filed: Jul. 29, 2013

(65) Prior Publication Data

US 2013/0313242 A1 Nov. 28, 2013

Related U.S. Application Data

(62) Division of application No. 11/081,942, filed on Mar. 17, 2005, now abandoned.

(51) Int. Cl.
| B23K 35/02 | (2006.01) |
| B23K 35/40 | (2006.01) |
| B23K 35/36 | (2006.01) |
| B23K 35/368 | (2006.01) |

(52) U.S. Cl.
CPC .............. *B23K 35/406* (2013.01); *B23K 35/368* (2013.01); *B23K 35/3608* (2013.01); *B23K 35/0266* (2013.01)

(58) Field of Classification Search
CPC . B23K 35/406; B23K 35/368; B23K 35/3608
USPC ............ 219/145.22, 146.31, 146.32, 146.52, 219/146.1, 146.23
See application file for complete search history.

(56) References Cited

U.S. PATENT DOCUMENTS

| 2,429,175 A | 10/1947 | Der Willigen et al. |
| 3,177,340 A | 4/1965 | Danhier |
| 3,385,696 A | 5/1968 | Hignett et al. |
| 3,423,565 A | 1/1969 | Malchaire |
| 3,778,588 A * | 12/1973 | Bishel ................ B23K 35/3033 219/137 R |

(Continued)

FOREIGN PATENT DOCUMENTS

| JP | 2001047278 A | 2/2001 |
| JP | 2001150186 A | 6/2001 |
| JP | 2004136355 A | 5/2004 |

OTHER PUBLICATIONS

CRC Handbook of Chenistry and Physics; Robert C. Weast, Ph.D.*

(Continued)

*Primary Examiner* — Phuong Nguyen
(74) *Attorney, Agent, or Firm* — Hahn Loeser & Parks LLP

(57) ABSTRACT

The present invention relates to a flux cored electrode used in electric arc welding and more particularly to the use of a specific form of magnesium particles in the core of the electrode or wire.

10 Claims, 3 Drawing Sheets

(56) References Cited

U.S. PATENT DOCUMENTS

| | | |
|---|---|---|
| 3,999,036 A | 12/1976 | Muratov et al. |
| 4,149,063 A | 4/1979 | Bishel |
| 4,220,487 A | 9/1980 | Andersen |
| 4,426,428 A | 1/1984 | Kammer et al. |
| 4,439,379 A | 3/1984 | Hart |
| 4,551,610 A | 11/1985 | Amata |
| 4,571,480 A | 2/1986 | Sakai |
| 4,617,055 A | 10/1986 | Miura et al. |
| 4,849,165 A | 7/1989 | Schaefer |
| 4,909,838 A | 3/1990 | Haddad |
| 5,300,754 A | 4/1994 | Gonzalez et al. |
| 5,580,475 A | 12/1996 | Sakai |
| 5,589,199 A * | 12/1996 | Anderson ............. B22F 1/0088 266/202 |

OTHER PUBLICATIONS

CRC, Handbook of Chemistry and Physics, Standard Test Sieves p. F-122, no date listed.

Chambers Dictionary of Science and Technology 1999, p. 849.

* cited by examiner

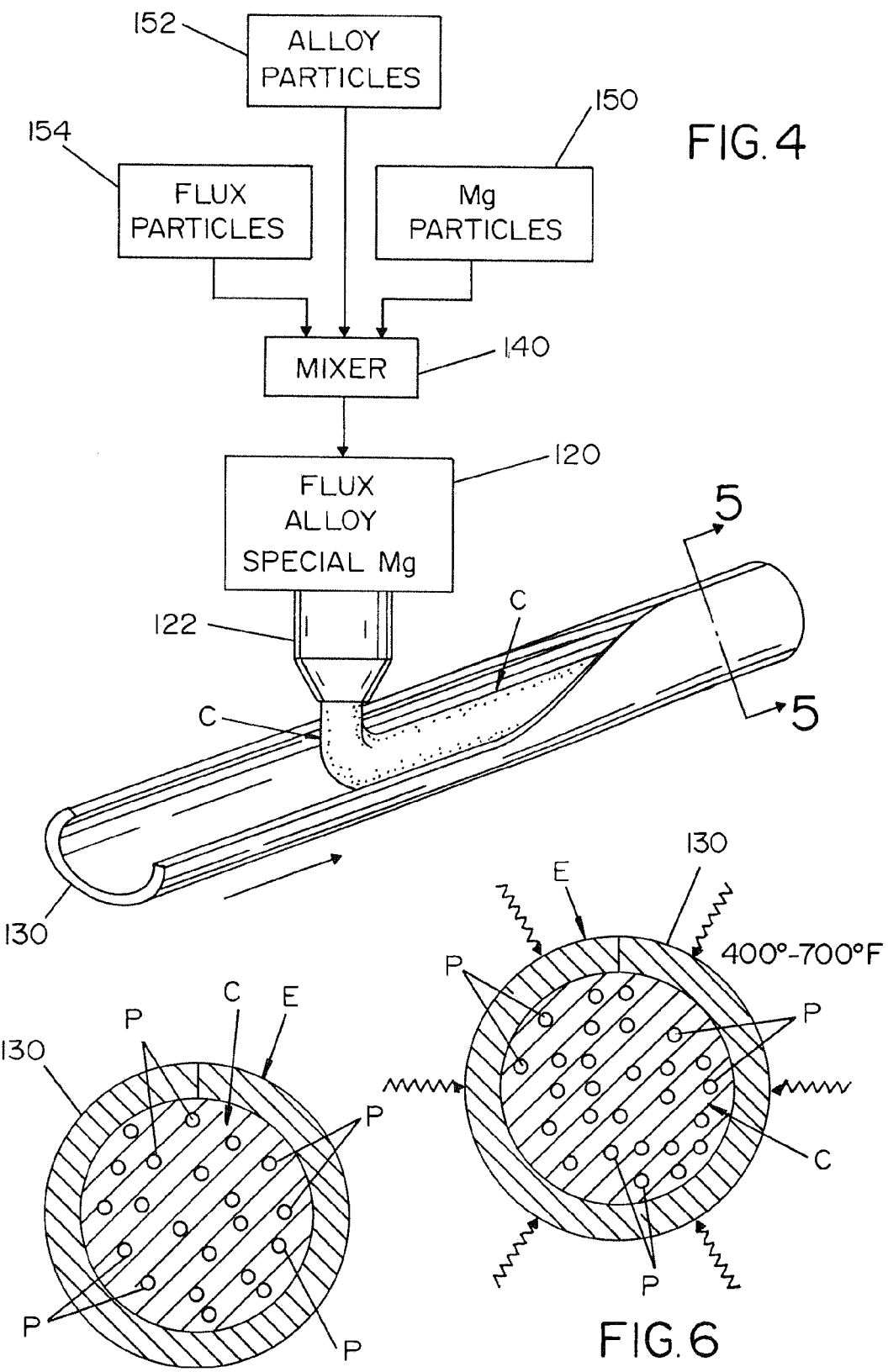

FLUX CORED ELECTRODE

CROSS-REFERENCE TO RELATED PATENT APPLICATIONS

This application is a divisional of pending U.S. patent application Ser. No. 11/081,942 filed Mar. 17, 2005, which is fully incorporated by reference herein.

TECHNICAL FIELD OF THE INVENTION

The present invention relates to a flux cored electrode used in electric arc welding and more particularly to the use of a specific form of magnesium particles in the core of the electrode or wire.

BACKGROUND OF THE INVENTION

Flux cored electrodes have been used for many years and include an outer metal sheath sized around an inner core of particles forming a flux system. To control the composition of the weld metal formed by using the electrode in an electric arc welding process, the core generally includes a number of metal particles to be melted and alloyed into the weld metal resulting from the welding process. It is common practice to use magnesium particles in the core of the electrode so these particles are evenly dispersed with the other core particles to produce a flux cored electrode. The use of small magnesium particles in flux cored electrodes is common.

The flux in a cored electrode that produces high impact welds while welding vertically up or overhead and has high melt off rates is disclosed in Amata U.S. Pat. No. 4,551,610. Particles of lithium oxide, iron oxide, silicon dioxide, lithium carbonates, magnesium and aluminum are used in the core. This patent is incorporated by reference herein to illustrate a representative flux cored electrode using magnesium. The magnesium particles can be particles employing the present invention. This patent also combines a large amount of elemental aluminum with a smaller amount of elemental magnesium to provide the oxidizing agents in the weld metal for a self shielded electrode. The present invention is primarily used for gas shielded electrodes, but also relates to the concept of using a combination of magnesium with standard aluminum particles. Thus, this patent teaches a type of electrode in which the present invention can be implemented.

In Sakai U.S. Pat. No. 4,571,480, another flux cored electrode using aluminum and magnesium particles is disclosed. This flux cored electrode patent discusses the function of magnesium particles and the combination of aluminum and magnesium in the core of the electrode. However, there is an indication that the magnesium leads to an increase in fume generation. Thus, it is suggested that magnesium particles should be in an amount not more than 10%. The magnesium vaporizes into an explosive substance upon exposure to heat of the arc. The explosive nature of the magnesium causes formation of a large number of spatter events. Thus, it is preferable that magnesium particles are in the form of a magnesium alloy, such as aluminum-magnesium, magnesium-silicon, magnesium-silicon calcium, nickel-magnesium or lithium-magnesium. Disadvantages of using magnesium particles, as discussed in the Sakai patent, are overcome by the formation of magnesium powder in accordance with the present invention. However, this patent does illustrate the problems to which the present invention is directed and the function of magnesium and the function of a magnesium oxide which prevents magnesium from being a deoxidizing or denitrification material in the molten weld metal. Thus, this patent teaches the reasons for elemental magnesium and slag forming magnesium oxide, together with some of the difficulties associated with using the elemental magnesium particles in the flux cored electrode. Indeed, the solution suggested in this prior art is the use of aluminum as an alloy with elemental magnesium metal. By using the present invention, modification of magnesium into an alloy particle before inclusion into the core of the electrode is not required. Another background flux cored electrode is described in Sakai U.S. Pat. No. 5,580,475 which again discusses the advantage of magnesium particles wherein cracking of the metal is reduced, together with the improved slag removability using magnesium oxide or magnesium particles in an amount of about 0.2%. This use of deoxidizing magnesium or slag forming magnesium oxide causes deterioration of the bead shape, but adds to the improved slag removability. Thus, there is a need to reduce both the amount of magnesium in the flux core and the amount of resultant magnesium oxide formed from magnesium during or before the welding process. Magnesium acts to reduce oxygen in the weld metal. MgO also removes free oxygen. These two magnesium sources are effective to improve toughness and blow hole resistance. The preferred source of magnesium is metal or elemental magnesium particles even though, as described, metal alloys of magnesium can be employed. In this patent, the magnesium oxide is incorporated into the flux core as a separate oxide so it performs its function in the welding process as the magnesium particles react actively as a deoxidizing agent. The magnesium and magnesium oxide improve the slag removability. Thus, there is a need to provide both magnesium in the metal form without requiring an alloy and magnesium as magnesium oxide. These two Sakai patents are incorporated by reference herein as illustrating electrodes which can employ advantageously magnesium particles of the present invention.

As described in the various prior art patents, magnesium particles are used in the core of flux cored electrodes to deoxidize the weld metal during the welding process. However, magnesium forms hydrides due to the inherent reactivity of magnesium. Consequently, as the cored electrode is manufactured by being extruded to size and then baked to a temperature of 400-700° F., the reactive magnesium particles tend to be hydrated. Furthermore, hydration occurs as the reactive particles are stored awaiting filling into the metal sheath prior to the extrusion and baking. Since the procedure for forming flux cored electrodes involves exposure to the atmosphere and high heat, the magnesium small particles in the core are also oxidized into MgO. This conversion changes the reactivity of the magnesium and decreases its oxidizing capability in the molten weld metal.

The baking process is required to remove drawing lubricants from the extruded electrode. By hydration of the magnesium particles and oxidation of the magnesium particles, the magnesium particles in the core material has a reduced amount of active magnesium available for its primary function of deoxidation in the weld metal. In other words, the amount of available magnesium for deoxidation prior to the electrode manufacturing process is substantially greater than the actual magnesium available in the final flux cored electrode. Some of the magnesium is converted to MgO or is hydrated by hydrophilic action of the very reactive, small magnesium particles. Hydration of the magnesium powder during storage and baking, reduces the amount of magnesium available for oxidation by producing a certain amount of $MgH_2$. This hydrogen compound decomposes in the molten metal to increase the amount of diffusible hydrogen in the weld. Thus, the formation of $MgH_2$ during processing or storage increases the tendency of the magnesium powder itself to cause higher levels of diffusible hydrogen. Furthermore, the oxidation of the magnesium particles into MgO reduces the amount of deoxidation potential of the particles in the core. Thus, the use of small magnesium particles in the past has involved balancing the advantage of magnesium to deoxidize the molten metal with the disadvantage of hydrogen pick-up of the magnesium powder. The hydrogen pick-up, together with oxidation of the magnesium powder during processing, reduces the deoxidation potential of the magnesium particles. The present invention reduces these disadvantages of using small magnesium powder in the flux core of an electrode. When the electrode is gas shielded, the magnesium particles are normally less than about 25% and there is no added aluminum powder. On the other hand, when the flux cored electrode is used for self shielding, the core includes small aluminum particles together with small magnesium particles, with the aluminum particles being greater in weight. The aluminum and magnesium particles form the deoxidation component of the core for self shielded electrodes. The present invention is primarily directed to gas shielded electrodes wherein the core merely includes small magnesium particles for deoxidation. However, the invention is also capable of being employed in self shielded flux cored electrodes where small aluminum and small magnesium powders are used for deoxidation. The term small means less than about 0.025 inches in major dimension. This particle size allows better distribution in the core.

SUMMARY OF THE INVENTION

In the past, magnesium particles were crushed and ground into small particles. These particles had a tremendously high ratio of surface area to total volume of the particles. Consequently, the magnesium particles have high exposed reactivity. This is in proportion to the ratio of exposed surface area to weight. The surface reactivity is different than the mass reactivity. To decrease the effect of the extreme surface reactivity of the otherwise high mass reactive magnesium material, it was suggested that a coating of silicon oxide be applied in some manner over the small particles. Coating of the small particles with a thin layer does not encompass the many crevices on the surface of the magnesium particles and, thus, was easily dislodged during the storage, pressure extrusion and baking. Furthermore, thin coating of the small magnesium particles was a delicate and expensive process. It could be done only in a batch procedure. Consequently, the thin coating of the otherwise high mass reactive magnesium particles with the extreme high surface reactivity, engendered by the large surface ratio, was only theoretical and not practical. Thus, a suggestion to reduce the surface reactivity of magnesium particles for use in flux cored electrodes was not commercially viable or physically effective.

The present invention recognizes the problems of providing the highly explosive, magnesium particles having a small size necessary for even distribution in the core of a flux cored electrode. This technical difficulty of providing small magnesium particles has been overcome by using gas atomized magnesium powders produced by atomizing metal magnesium with high velocity inert gas, such as argon. Such particles are generally spherical due to the surface tension associated with each particle during the gas atomized procedure. To provide the necessary small dimension for uniform distribution in the core of an electrode, the individually atomized particles of magnesium are sized or graded by a screen or sieve process. The spherical particles pass through a US Standard screen of 30 or 40 mesh, but not through a screen of about 325 mesh. Thus, the particles have a small size in the general range of about 0.025 to 0.002 inches in diameter. This small size allows the individual particles to be evenly dispersed through the core material of the electrode. Since the sizing is done by a screen procedure not crushing, the diminution of the particle size of the magnesium does not increase the ratio of surface area to volume or mass of the small magnesium powder or particles. Each particle is generally spherical caused by surface tension during the molten metal forming process and a gradation procedure is employed for producing the desired small size of particles for the flux cored electrode manufacturing procedure. The atomizing process is quite expensive; however, the advantageous end result is economically justified. The particles have a low surface reactivity, but retain the same level of mass reactivity.

The spherical particles having small size minimizes the surface area ratio to thereby reduce the effective exposure reactivity of the magnesium particles. Consequently, during storage and processing of the core material or magnesium particles, there is a less tendency for the magnesium to oxidize. Indeed, during the baking action, very little MgO is formed due to the oxidation of the reduced reactive nature of the inventive particles. Furthermore, during storage of the reduced surface reactivity magnesium particle, there is a lesser tendency to form $MgH_2$ or $MgOH_2$ so there is a lesser tendency for the magnesium powder to attract hydrogen. Such hydration of a core material constitutes a source of diffusible hydrogen in the weld metal of the welding process. Consequently, by using the present invention, the tendency of the weld metal to crack is reduced without the necessity for highly expensive procedures to avoid hydrodration of the magnesium during storage and processing. The present invention reduces the diffusible hydrogen in localized areas of the resulting weld metal and substantially improves the cracking characteristics of the weld metal, without drastically increasing the expense associated with reducing the hydrogen pick-up of magnesium during the manufacturing process. The advantages of the invention greatly offsets the higher costs of producing the small magnesium particles before they are shipped to the manufacturing line for the cored electrode. In the invention, it is preferred that the spherical particles with lower surface area are produced by a gas atomized process. Such process has heretofore been employed to produce large particles primarily for military use in flares. The military magnesium particles are graded, preferably through a 40 mesh screen. Thus, the magnesium powders are separated into a small size for even distribution in the core of an electrode. Standard military gas atomized magnesium powders has the magnesium droplets frozen while in an unrestrained molten state. They are in a substantially spherical shape, which is defined as the shape caused by surface tension on freezing instead of crushing of large particles. Although a 40 mesh screen size is preferred, it has been found that the invention is applicable with a larger sized magnesium particle, such as particles passing through a 30 mesh screen. Thus, the small particles are formed without crushing and results in a smooth surface. The relative size of the surface area reduces the surface reactivity of the individual particles. These individual gas atomized particles may be treated with hydrophobic fumed silica or caruba wax. This coating procedure further reduces the surface reactivity of the otherwise smooth surface formed by the gas atomizing process. Thus, the present invention utilizes small magnesium particles with a low surface reactivity caused by a decrease in the ratio of surface area to mass or weight.

In accordance with the present invention there is provided a flux cored electrode including a metal sheath surrounding a core of particles containing a flux system with dispersed small magnesium particles having generally spherical shape and having a size to pass through a 30 U.S. Standard sieve.

In accordance with another aspect of the invention, the flux cored electrode as defined above also includes particles of alloying agents as well as a fluxing system based upon titanium dioxide.

In accordance with another aspect of the present invention there is provided a method of electric arc welding on a workpiece. This method comprises providing a flux cored electrode with spherical particles of elemental magnesium having a particle size of less than about 0.025 inches in diameter, passing a current through the electrode and between the electrode and the workpiece to melt the electrode into molten metal wherein the magnesium particles are melted and reduce free oxygen in the molten metal, and forcing a shielding gas around the molten metal. When the welding method is to use a flux cored electrode that this self shielding, it is normally advantageous to provide small aluminum particles to act with the small magnesium particles wherein the aluminum particles have a greater weight than the magnesium particles.

Yet another aspect of the present invention is the graded magnesium particles themselves. These particles are used for flux cored electrodes and each has a surface tension created smooth outer surface and are graded to a size of less than about 0.025 inches in diameter.

The primary object of the present invention is the provision of magnesium particles for use in a flux cored electrode, which magnesium particles have a reduced surface reactivity to prevent oxidation and hydrogen reaction during the storage and manufacturing of the electrode.

Another object of the present invention is the provision of magnesium particles, as defined above, which particles have an outer surface formed by surface tension as contrasted to forming a jagged surface by a mechanical crushing action.

Still a further object of the present invention is the provision of powdered magnesium particles, as defined above, which particles have a graded size less than about 0.025 inches in diameter and a minimum size normally greater than about 0.002 inches in diameter.

These and other objects and advantages will become apparent from the following description taken together with the accompanying drawings.

BRIEF DESCRIPTION OF THE DRAWINGS

FIG. 4 is a schematic pictorial view illustrating the first step of filling the sheath in manufacturing a flux cored electrode;

FIG. 5 is a cross-sectional view of a flux cored electrode during the manufacturing process preparatory to being drawn through a die and heated in a furnace;

FIG. 6 is a cross-sectional view of a finished flux cored electrode illustrating the final baking procedure;

DETAILED DESCRIPTION OF THE INVENTION

Figure 1:
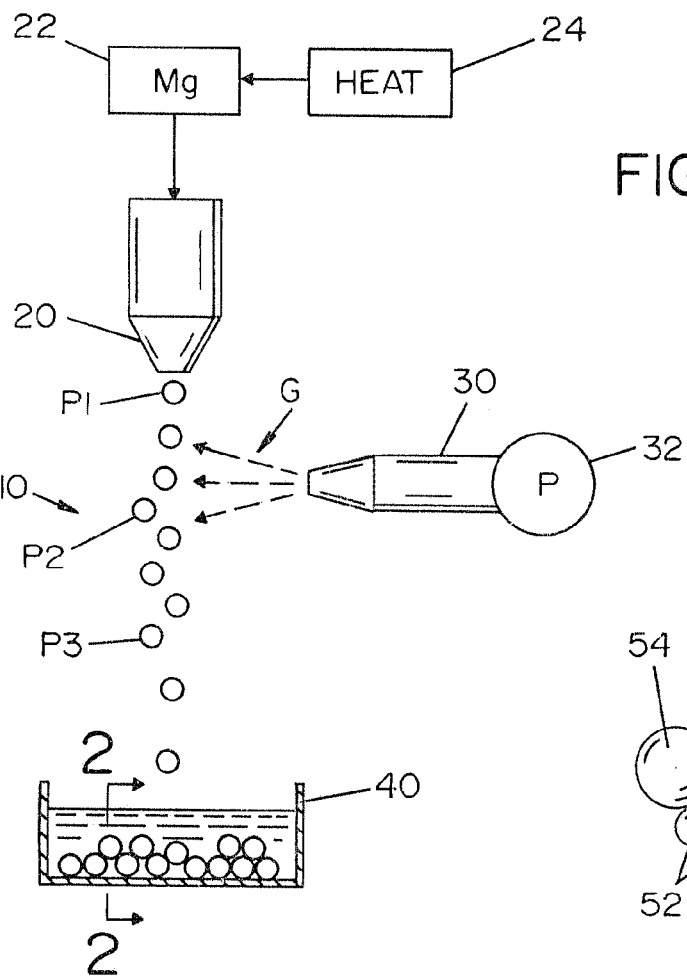
FIG. 1 is a schematic diagram of a process for forming air atomized magnesium particles having a variety of spherical sizes.
Figure 2:
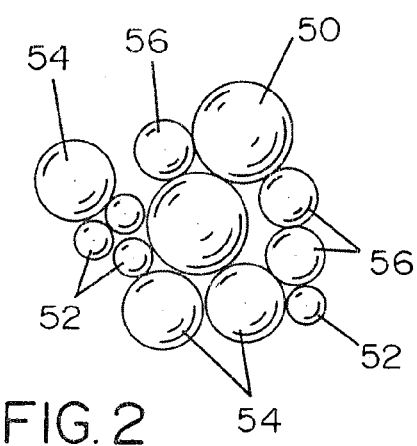
FIG. 2 is an enlarged partial view taken generally along line 2-2 of FIG. 1.
Figure 3:
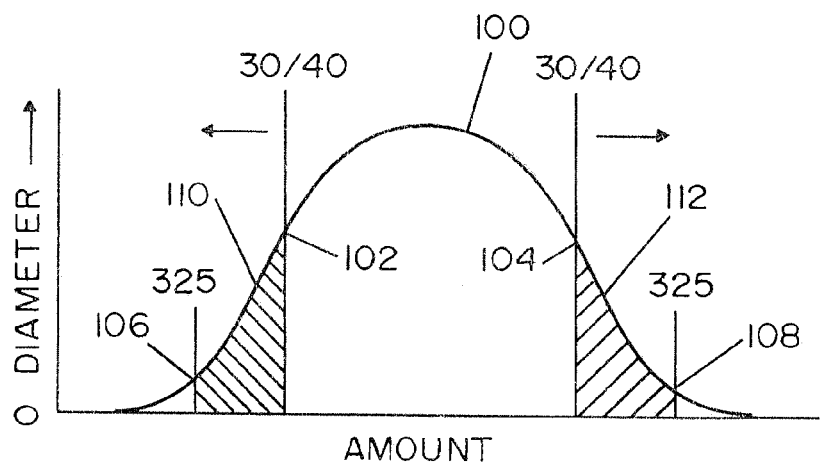
FIG. 3 is a distribution and gradation curve used in practicing the preferred embodiment of the present invention.

To minimize the oxidation of small magnesium particles and the ability of magnesium particles to attract hydrogen, the present invention involves the use of a specially produced magnesium particle, which particles are graded for a selected range of particle sizes. This concept is schematically illustrated in FIGS. 1-3 wherein an air atomizing system 10 includes a molten metal nozzle 20 receiving molten magnesium from supply 22 maintained in a molten condition by heat source 24. Nozzle 20 causes droplets of magnesium to fall by gravity past one or more gas jets 30 having a high velocity spray of gas G directed toward the downwardly traveling individual droplets. These droplets are particles which translate from molten particles P1 to partially solidified particles P2 into fully solid particles P3 as the particles P pass downwardly through gas G from one or more high pressure jet 30. This process is used for producing atomizing magnesium powder for military use and is produced by Hart Metals, Inc. of Tamaqua, Pa. Particles P have over 99% free metallic magnesium and minor traces of other compounds, such as less than 0.030 iron oxide. The maximum amount of carbides is 0.002%. Essentially, particles P1, P2 and P3 dropping downwardly by gravity from nozzle 20 are pure metal magnesium starting in a molten state. This process produces particles P of various sizes as shown in a lower tray or hopper 40. These particles have a size distribution as schematically illustrated in FIG. 2 and graphically in FIG. 3. Particles P are illustrated as particles 50 that are large and particles 52 that are small. In between the large and small particles there are different sized particles, such as medium sized particles 54 and 56. Indeed, the distribution of the particles in the process performed by system 10 are in the form of a common bell curve 100. In accordance with the invention, the particle size used in a cored electrode is a particle size greater than a number 30 sieve as indicated by point 102 and point 104. The particles used in practicing the invention are generally greater than 0.25 inches in diameter. To prevent the existence of minute finds, which are highly explosive, the invention involves a minimum diameter of about 0.02 inches indicated as a number 325 sieve by point 106, 108. Thus, the present invention involves small gas atomized magnesium particles distributed in areas 110, 112 of bell curve 100, as shown in FIG. 3. In practice, the magnesium particles P pass through a number 40 mesh screen with 98% of the particles passing through a number 60 screen. A very small amount of particles can pass through a number 325 screen. In practice, this small amount is drastically less than about 5%. Thus, less than 2% of the particles are smaller than 20 microns. The particles include 99% magnesium with only a trace amount of impurities. As shown in FIG. 1, particles P1 are molten and dropped downwardly. These molten particles use surface tension to assume a generally spherical configuration, with a smooth outer surface. When exposed to inert gas G, the outer surfaces of particles P1 are partially solidified as indicated by particles P2. Full solidification is effected as particles P drop downwardly into receptacle 40, which receptacle can be filled with a liquid cooling bath to finalize solidification of particles P. In the vertical direction, a plurality of vertically aligned jets 30 can successively solidify the particles dropping from nozzle 20. Thus, particles P have an outer surface which is defined in this application as being generally spherical and has a graded size in the general range of 0.25-0.002 inches in diameter. These particles are then placed in containers and shipped to a manufacturing facility where they are stored for a period of time. During transportation and storage, the spherical smooth outer surface of particles P prevents the particles from oxidizing or hydrating. This phenomenon maintains the elemental magnesium composition of particles P, even though they are reduced to a small size. The surface shape does not allow the particles to absorb hydrogen for subsequent adverse effect in the weld metal.

In accordance with the present invention, particles P produced in accordance with the procedure described in FIGS. 1-3 are used in the core of flux cored electrode E by a standard procedure for making flux cored electrodes, as shown in FIGS. 4-6. Particle dispenser 120 has a nozzle 122 for directing small particulate core material C, i.e. core C, into the trough of sheath 130 formed of a mild steel. Particles of core C generally include a fluxing system, metal alloying particles and deoxidizing particles, such as magnesium particles P. When the flux cored electrode is gas shielded, a certain amount of aluminum particles is included in core C. In accordance with standard technology particle storage bins 150, 152 and 154 direct magnesium particles P, alloying particles and flux particles, such as titanium dioxide with other additives, into dispenser 120 by way of solid mixer 140 so that the particles are all evenly distributed through core material C. By providing small graded particles, such as described in relationship to FIG. 3, magnesium particles P can be evenly distributed through core material C. After depositing core material C into the trough of sheath 130, the sheath is closed into a cylindrical configuration as generally illustrated in FIG. 5. In this manner, core material C is compacted by sheath 130. The compact core material C is then sized through a drawing die which involves drawing compounds, that are removed by a subsequent baking procedure, as schematically illustrated in FIG. 6. The extruded, sized electrode E is passed through a heating oven at a temperature between 400-700° F. During this heating process, the physical surface characteristics of novel, small particle P prevent oxidation of the particles by ambient oxygen captured within sheath 130. Particles P remain elemental magnesium with the natural mass reactivity characteristic of magnesium metal itself, but not the overreactive physical surface reactivity characteristics heretofore obtained by crushed small particles of magnesium. After electrode E has been formed into a flux cored electrode having an indeterminate length, it is stored on a reel or in a box or drum for subsequent use in an electric arc welding process schematically illustrated in FIG. 7.

Figure 7:
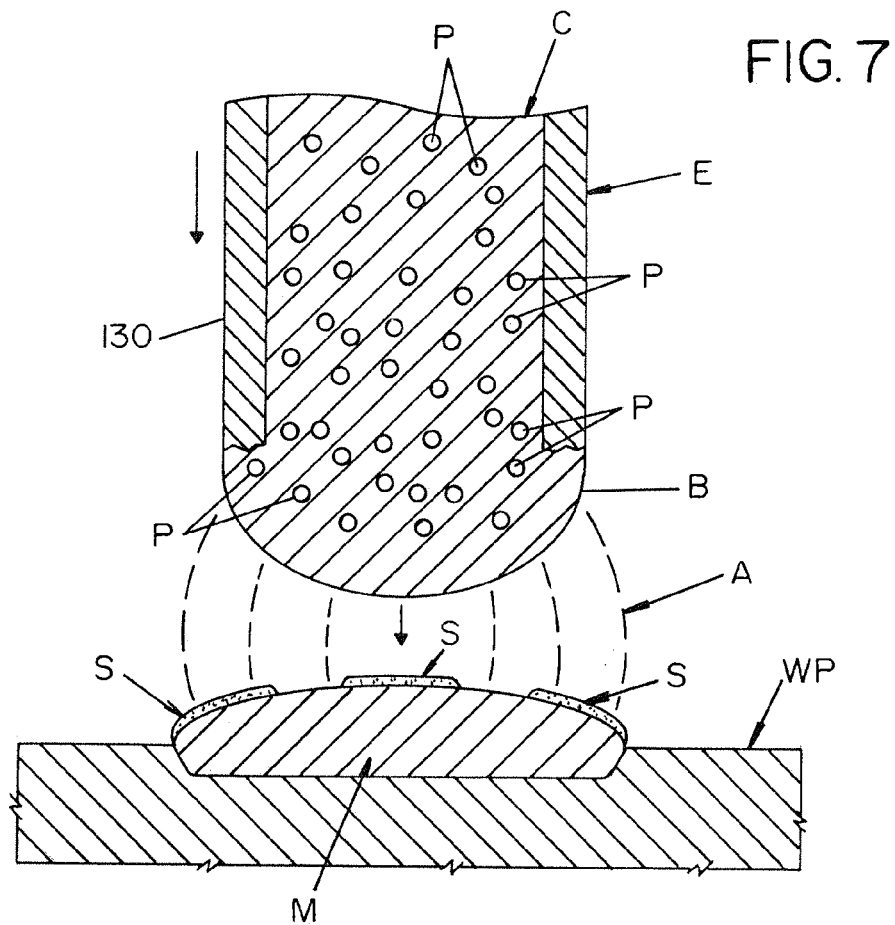
FIG. 7 is an enlarged, generally cross-sectioned view of the preferred embodiment of a flux cored electrode used in an electric arc welding process; and, FIG. 8 is a schematic view illustrating a thin coating over a small particle of magnesium produced by the procedure schematically illustrated in FIGS. 1-3.
Figure 8:
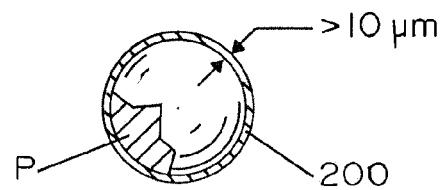

Referring now in more detail to the arc welding process schematically illustrated in FIG. 7, electrode E is moved downward to workpiece WP while arc A is formed between the metal sheath 130 and workpiece WP. The welding process involves formation of a molten metal ball M on the end of advancing electrode E. Core material C includes alloying metal with particles that are melted with sheath 130 to form ball B. Particles P are oxidized in ball B to attract oxygen and form magnesium oxide. This MgO is removed as slag S formed on the top of molten metal M deposited by the welding process. Magnesium particles P are reactive in proportion to the molten mass and not to the pre-melted surface area. The magnesium deoxidizing constituents of core material C retain that ability to reduce the oxygen while being melted by the welding process in molten metal ball B. Thus, there is no contamination and diminution of the primary deoxidation function of particles P by previous surface attraction of oxygen and/or hydrogen. Consequently, particles P perform their primary function without the deleterious physical properties of prior crushed magnesium particles, coated or uncoated. To reduce further the surface activity of particles P, the particles can be coated with a small layer of protective material 200, as shown in FIG. 8. This protective material can be an organic compound or a silicon compound according to the ability to use such coatings economically. The coating is not required in practicing the invention; however, the coating is a physical barrier that can reduce the surface reactivity of the particles P prior to melting in molten metal ball B as shown in FIG. 7. The present invention is primarily employed for flux cored electrodes that are gas shielded gas. A specification for core material C of a gas shielding electrode using the present invention is set forth in Table I.

TABLE I

| Core | Percentage Weight |
| --- | --- |
| Titanium Dioxide | 0-100% |
| Ferro Manganese | 0-50% |
| Ferro Silicon | 0-50% |
| FerroBoron | 0-50% |
| Ferro Molybdenum | 0-50% |
| Nickel | 0-50% |
| Sodium Aluminum Fluoride | 0-50% |
| Potassium Silicon Fluoride | 0-50% |
| Ferro Titanium | 0-50% |
| Alumina | 0-50% |
| Magnesium | 0-25% |

Magnesium particles P are also useful for gas shielded electrodes. An example of the core material for such electrode is set forth in

TABLE II

| Core | Percentage Weight |
| --- | --- |
| Titanium Dioxide | 0-100% |
| Ferro Manganese | 0-50% |
| Ferro Silicon | 0-50% |
| FerroBoron | 0-50% |
| Ferro Molybdenum | 0-50% |
| Nickel | 0-50% |
| Sodium Aluminum Fluoride | 0-50% |
| Potassium Silicon Fluoride | 0-50% |
| Ferro Titanium | 0-50% |
| Aluminum | 0-100% |
| Barium Fluoride | 0-100% |
| Magnesium Oxide | 0-75% |
| Lithium Fluoride | 0-75% |
| Magnesium | 0-75% |
| Cerium | 0-75% |
| Barium Oxide | 0-75% |

The invention overcomes the disadvantage of prior magnesium particles that were formed into small sizes by being crushed and ground into a fine powder. The effect of the crushing action is to increase surface area drastically and this surface reactivity defect cannot be corrected by merely a thin coating. The invention involves not only the flux cored electrodes using particles P; however, involves the process of using such electrodes for welding and the small magnesium particles themselves. Other procedures can be used for producing the generally spherical shape, which is the shape caused by surface tension as contrasted with a crushing or grinding action.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of forming a flux-cored electrode containing essentially spherical particles of magnesium without a step of crushing said magnesium particles comprising:
sizing said essentially spherical magnesium particles by sieving to a range between approximately 0.002 inches to 0.025 inches in diameter, said essentially spherical magnesium particles having been formed by gas atomization of molten magnesium, said essentially spherical magnesium particles comprising more than 99% free metallic magnesium and no more than 0.030% iron oxide and less than 0.002% carbides;
adding fluxing particles, metal alloying particles and deoxidizing particles comprising at least said spherical magnesium particles into a trough of a sheath;
closing said sheath into a generally cylindrical configuration;
sizing said sheath by drawing through a drawing die; and
baking said sheath in a heating oven at between approximately 400-700° F. in which said spherical magnesium particles remain elemental magnesium with the natural mass reactivity characteristic of magnesium metal and not a more reactive surface of a crushed particle of magnesium.

2. The process of claim 1 wherein
said fluxing particles comprise titanium dioxide.

3. The process of claim 2 wherein
said metal alloying particles comprise ferro alloys.

4. The process of claim 1 which further comprises the step of:
adding aluminum particles into said trough whereby a weight of said aluminum particles is greater than a weight of said essentially spherical magnesium particles.

5. The process of claim 1 which further comprises the step of:
coating said essentially spherical magnesium particles with a protective coating of 10 microns or less and wherein said coating is selected from the group consisting of an organic compound or silicon.

6. A method of electric arc welding on a workpiece, said method comprising:
providing a flux cored electrode with essentially spherical particles of elemental magnesium, said essentially spherical magnesium particles having been formed by gas atomization of molten magnesium, said essentially spherical magnesium particles comprising more than 99% free metallic magnesium and no more than 0.030% iron oxide and less than 0.002% carbides, said essentially spherical magnesium particles having a graded particle size of between approximately 0.002 inches to 0.025 inches in diameter, said electrode having been previously baked at between approximately 400-700° F. in which said spherical magnesium particles have a reduced surface reactivity and remain elemental magnesium with the natural mass reactivity characteristic of magnesium metal and not a more reactive surface of a crushed particle of magnesium, said reduced surface reactivity spherical magnesium particles having a lesser tendency to form $MgH_2$ or $MgOH_2$ than said crushed particle of magnesium;
passing a current through said electrode to melt said electrode into molten metal whereby said essentially spherical magnesium particles are melted and reduce fee oxygen in said molten metal to a greater degree than if magnesium particles had been crushed to a particle size of between 0.002 inches to 0.025 inches;
directing a shielding gas around said molten metal.

7. The process of claim 6 wherein
said flux cored electrode comprises particles of titanium dioxide.

8. The process of claim 7 wherein
said flux cored electrode comprises particles of ferro alloys.

9. The process of claim 6 which further comprises the step of:
adding aluminum particles into said flux cored electrode whereby a weight of said aluminum particles is greater than a weight of said essentially spherical magnesium particles.

10. The process of claim 6 which further comprises the step of:
coating said essentially spherical magnesium particles with a protective coating of 10 microns or less and wherein said coating is selected from the group consisting of an organic compound or silicon.

* * * * *